Aug. 30, 1966  O. E. SEAY  3,269,181
FLOW RESPONSIVE DEVICES
Filed Jan. 23, 1964

INVENTOR.
ORUM E. SEAY
BY
Burns, Doane, Benedict, Swecker & Mathis
ATTORNEYS

United States Patent Office 3,269,181
Patented August 30, 1966

3,269,181
FLOW RESPONSIVE DEVICES
Orum E. Seay, Duncan, Okla., assignor to Halliburton Company, Duncan, Okla., a corporation of Delaware
Filed Jan. 23, 1964, Ser. No. 339,668
3 Claims. (Cl. 73—228)

This invention relates to fluent material flow responsive apparatus, and more particularly, to flow meters which are adapted to measure the flow of particulate materials.

In the past, the industry has provided mass rate meters having an impact sensing element positioned in a conduit for deflecting particulate material flowing therethrough. By measuring the instantaneous impact of the material on the sensing element, the amount of material flowing through the conduit in a unit of time may be estimated. Such devices often include a distributor element positioned in an upstream relation to the sensing element for absorbing the shock of the falling material and evenly distributing the material on the sensing element. Although such mass rate meters offer the advantage of measuring flow with interruption thereof, such meters are not always satisfactory because of safety considerations and because of inaccuracy in measurement. One source of inaccuracy stems from the tendency of material to accumulate on the meter elements positioned in the conduit. Another is the inaccuracy in estimating the flow of materials over a unit of time caused by momentary flow fluctuations.

It is an object of this invention to provide a flow meter for safely and accurately measuring the flow of fluent material in a conduit.

It is another object of this invention to provide a flow meter having a distributor element and a sensing element wherein the tendency of either or both of these elements to accumulate material thereon is minimized.

It is still another object of this invention to provide a flow meter wherein inaccuracy induced by momentary fluctuations of the amount of material flowing in the conduit is minimized.

In achieving these and other objects which will appear hereinafter, this invention provides a fluent material flow responsive device comprising a housing, impact sensing means positioned in said housing, said sensing means including an upstream face constructed of permeable material, and means for directing pressurized air to said sensing element and through said permeable material.

For purposes of even distribution of fluent material over the periphery of the impact sensing means, the instant device may further include a distributor means in spaced relation to said sensing means and on the upstream side thereof, said distributor means including an upstream face constructed of permeable material, and means for directing air under pressure to said distributor means and through said permeable material.

To further reduce accumulation of materials on the sensing means and thereby induce measurement accuracy, supporting means for the sensing element may be provided with flow cutting means on the upstream face to reduce the accumulation of material thereon.

To minimize the inaccuracy induced by momentary fluctuation in the amount of material impacting on the sensing means of the instant device, means to dampen premature movement of the sensing means may be provided.

To enhance safety in operation, pneumatic means may be provided throughout the apparatus for rotating the distributor means, for generating a signal proportional to the magnitude of flow detected by the sensing means, and for directing pressurized air to at least one of the distributor means and the sensing means to minimize material accumulation thereon.

The preferred embodiment of the invention is illustrated in the accompanying drawings, in which.

Figure 1:
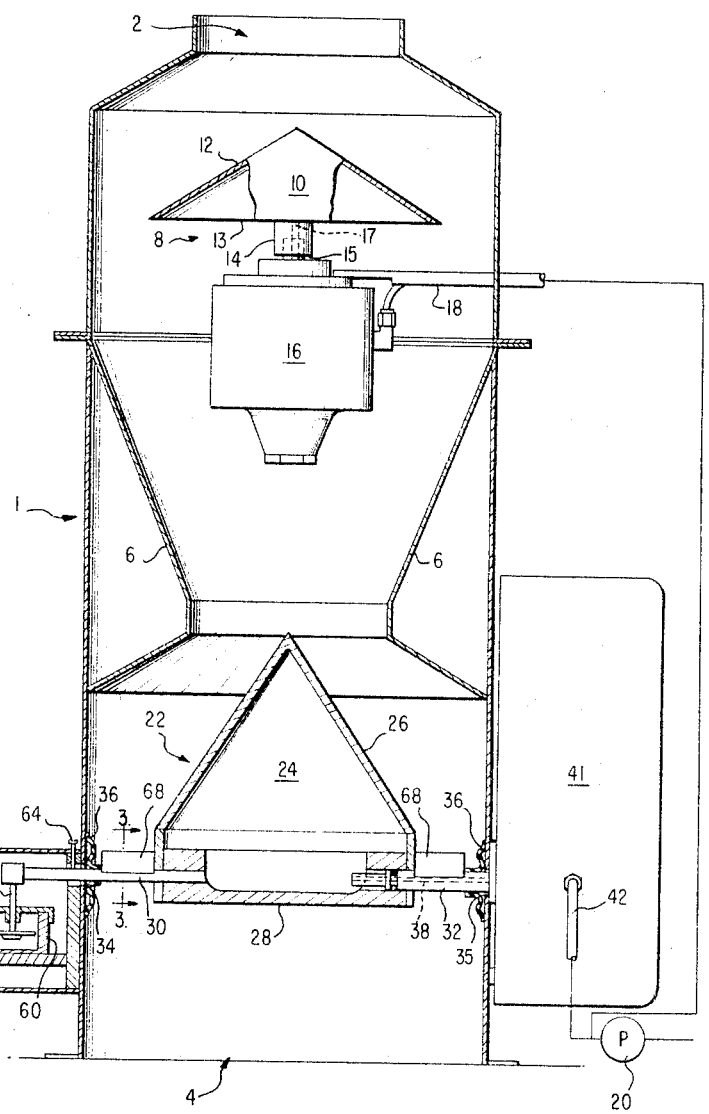
FIGURE 1 is a schematic, vertical, cross-sectional view showing the instant flow meter.

Referring in more detail to FIGURE 1 of the drawings, a vertical conduit or housing 1 is provided having a restricted, fluent or pulverulent material inlet 2 and a outlet 4 of increased diameter. The housing 1 is further provided with a necked-down portion 6 intermediate the length thereof. Positioned subjacent the restricted inlet 2 and above the necked-down portion 6 is a fluent material distributor 8. The distributor 8 is so positioned so as to momentarily interrupt and deflect the fall of material entering the inlet 2 and to redirect such material to the inclined walls of the necked-down portion 6.

The distributor 8 comprises a distributor cone 10, the apex of a conical upstream face 12 of which is fixed above a circular base 13. The upstream face 12 of the distributor cone 10 is positioned to deflect and absorb the shock of falling fluent material and is constructed of a permeable and porous material.

The porous and permeable material is of an interconnected pore structure and may be sintered bronze, porous Carborundum or porous porcelain. The degree of permeability is substantial. Permeability is frequently defined as the amount of air, measured in cubic feet and at 70° F. and 25% relative humidity, which will pass through the area of one square foot of dry porous material in one minute when tested under an equivalent pressure differential of two inches of water. In light of this definition, it has been found that a material permeability of 15 is satisfactory although it will be appreciated that the desired permeability of the material may vary depending on system air pressure and the nature and particle size of the fluent material the flow of which is to be measured.

The lower side of the base 13 of the distributor cone 10 is provided with a centrally mounted hub 14 fixedly mounted on a rotatable shaft 15 of pneumatic motor 16 fixed in the housing 1. Both the hub 14 and the shaft 15 are provided with a central bore 17 for directing pressurized air from the motor 16, a conduit 18, and a pneumatic pump 20 to the interior of the distributor cone 10. The pneumatic pump 20 functions to rotate the air motor 16 and the distributor cone 10 to throw fluent material outwardly in the housing 1. Also, the pump supplies pressurized air internally of the distributor cone 10 and through the permeable material of the upstream face thereof for a cleansing action.

Positioned subjacent to and coaxially with the distributor 8, and below the necked-down portion 6 is an impact sensing unit 22. The impact sensing unit 22 comprises an impact cone 24, the apex of a conical face 26 which is fixed above a circular base 28. The face 26 is also constructed of permeable or porous material, as discussed heretofore.

The sensing unit 22 is movably supported in the housing 1 by a dash pot arm 30 and a strain arm 32 connected to the base 28, each of these arms projecting through apertures 34, 35, respectively, in the sides of the housing 1. Flexible seals 36, mounted about the arms 30, 32 and the apertures 34 and 35, prohibit the entry of materials therein.

The strain arm 32 is provided with a longitudinally extending air passage or bore 38 through the length thereof. The outer end 40 of the arm 32 is pivotally mounted in a pneumatic signal apparatus housing 41 and the bore 38 is in fluid connection with a conduit 42 from the pneumatic pump 20. In this manner, pressurized air may be directed internally of the sensing cone 24 and through the permeable face thereof.

Figure 2:
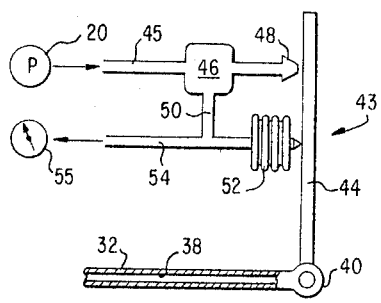
FIGURE 2 is a schematic representation of pneumatic signal means associated with the flow meter shown in FIGURE 1.

Positioned in the housing 41 is a pneumatic signal apparatus 43 schematically illustrated in FIGURE 2. The signal apparatus 43 is a flapper-nozzle arrangement of the type discussed in "Instruments and Control Systems," February 1963, issue, beginning at page 113 and of the type shown in the U.S. patent to Copland et al., 3,039,310. As is known in the industry, such flapper-nozzle systems usually include a flapper 44, which in the instant device is connected to the strain arm 32 so as to pivot therewith. The flapper-nozzle arrangement functions to convert a small motion of, or force on the impact sensing element 22 into a proportional pneumatic signal.

An air supply, as from the pneumatic pump 20, is directed through a conduit 45, through a conduit constriction (not shown) in a pneumatic relay 46 to a nozzle 48. The opening in the nozzle is required to be larger than the conduit constriction and pressure at the nozzle is generally lower than the pressure at the constriction. When the flapper 44 is moved away from the nozzle 48, the pressure at the nozzle is reduced. Conversely, when the flapper 44 is moved closer to the nozzle 48, the pressure at the nozzle is increased. Flapper movement of only a few thousandths of an inch produces a proportional pneumatic signal which may vary from near zero to the supply pressure. The function of the pneumatic relay 46 is to direct air at nozzle pressure through a conduit 50 to a feed back bellows 52 to restore the flapper to equilibrium. Also, air at nozzle pressure is directed through a conduit 54 to a meter 55, or the like, which utilizes the pneumatic signal to indicate the amount of material impacting against the impact sensing unit 22.

To dampen movement of the sensing unit 22, a dash pot 56 is provided. An outer end of the dash arm 30 is connected by a piston rod 57 to a piston 58 positioned internally of a fluid containing dash pot cylinder 60. The cylinder 60 is fixedly positioned in a housing 62 mounted on the lower end of the housing 1. An adjustment screw 64 is threadably engaged in the upper end of the housing 62 adjacent the dash pot arm aperture 34. The lower end of the screw abuts the dash pot arm 30 to thereby limit movement and aid in the positioning of the sensing unit 22. It will be seen that the dash pot 56 delays movement of the sensing unit 22 and reduces inaccuracies which might be induced by momentary fluctuations in the amount of material flowing through the housing 1 as are reflected by the sensitive, flapper-nozzle pneumatic signal apparatus.

Figure 3:
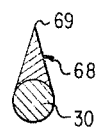
FIGURE 3 is a cross-sectional view of supporting means for the impact sensing means shown in FIGURE 1 and taken along lines 3—3 thereof.

To reduce accumulation of dry material on the dash pot arm 30 and the strain arm 32, the upstream face of each of these arms is provided with a flow-cutting, elongated member 68 which is triangular in cross-section, as shown in FIGURE 3. The apex 69 of the triangular element is directed upstream relative to each arm 30, 32. It will be appreciated that material striking the arms 30, 32 will tend to slide off the inclined edges of the triangular element 68. Accumulation of material on these arms and the consequential inaccuracy induced in the measuring system is minimized.

In operation, fluent, particulate material is directed through the housing inlet 2 in a free-falling condition. The momentum of the free-fall is reduced as the materials strike the distributor cone 10. The rotation of the distributor cone 10 by the air motor 16, aided by the swirl of outwardly directed air through the permeable face 12, acts to throw material impinging thereon in an outwardly direction toward the walls of the housing 1, after which the material falls, at a reduced velocity, against the inclined walls of the necked-down portion 6. The material then slides down the inclined walls of the necked-down portion 6, to fall, at a reduced and determinable velocity, evenly about the periphery of the impact sensing cone 24.

It should be noted that the rotation of the distributor cone 10 not only aids in distributing material evenly about the sensing cone 24 to enhance meter accuracy, but also aids in cleansing the cone 10 of material accumulation and hinders "bridging" of material across the upper end of the housing 1.

Depending upon the amount of material impinging against the impact sensing unit 22, the cone 24 will be deflected to a comparable degree, in a downward direction. Premature movement is dampened by the dash pot 56. As the impact sensing cone is pivoted downwardly, the strain arm 32 acts to move the flapper 44 thereby altering air pressure at the nozzle 48. Air, at nozzle pressure, is directed through the pneumatic relay 46 and the conduit 54 to the pressure indicator 55. Because the air signal is of a pressure the magnitude of which is proportional to the amount of material impacting against the sensing unit 22 at any given time, the amount of material flowing in the housing over a period of time may be estimated.

Material falling through the housing 1 tends to accumulate on any element interrupting flow. To circumvent this accumulation and the measurement inaccuracies induced thereby, pressurized air is directed from the pump 20 internally of the cones 10 and 24. This air moves outwardly through the permeable material of the upstream faces of the cones to bathe the surface of these cones in a lubricating skin or cushion of air. Material falling in a generally vertical direction impinges against the upstream faces of these elements but is immediately deflected outwardly by the air thereby reducing the tendency of the material to accumulate. As material sweeps downwardly over the cones on the lubricating skin of air, the material itself aids in the cleansing action.

Although the preferred form of this invention includes power means for rotating the distributor cone 10, it should be noted that, for material of great fluency, rotation of the cone may not be required and the cone 10 may be fixedly mounted in the housing 1.

Further, it will be obvious to those skilled in the art that while the instant device is disclosed as performing a mass rate meter function, the device is equally adaptable to flow control and weight recording functions.

It will be appreciated that by the provision of a rotating air-washed distributor, material "bridging" across the upper end of the flow meter housing is circumvented. Further, the distributor insures even distribution of material on the sensing unit and therefore a higher degree of accuracy in measurement.

The provision of an air-washed sensing cone also operates to circumvent "bridging" but also directly induces accuracy by deflecting the flow and eliminating weighty material accumulation on the sensing cone which would distort measurement. The sensing cone is free to reflect impact rather than deadweight. The flow-cutting elements for the sensing cone supporting arms offer similar advantages.

By the provision of dampening means to reduce premature movement of the sensing element, accuracy in reflecting flow by a sensitive pneumatic signal means is still further enhanced.

Finally, because the entire dry material mass rate meter is pneumatically motivated, the danger of spark-induced explosion is significantly reduced.

Although a single embodiment of the invention has been illustrated and described in detail, various modifications and alterations will suggest themselves to persons skilled in the art. It is therefore intended that the foregoing be considered as exemplary only and that the scope of the invention be ascertained from the following claims.

I claim:
1. In a fluent material flow meter of the type comprising a vertically extending housing having a fluent material inlet adjacent the upper end thereof, an impact sensing element movably positioned in said housing subjacent said inlet, said sensing element having an upstream face adapted to be impacted by fluent material falling through said housing, supporting means movably supporting said sensing element for limited vertical deflection in response to impact thereon by the fluent material, signal means associated with said support means for indicating the extent of vertical deflection of said sensing element, the improvement comprising pressure means for directing pressurized fluid internally of said sensing element, said upstream face of said sensing element being constructed of fluid transmitting material whereby pressurized fluid is directed through said upstream face for lubricating the same and circumventing material accumulation thereon.

2. In a fluent material flow meter according to claim 1, said device further including distributor means in said housing subjacent said inlet and supra-adjacent said sensing element for directing material thereabout, an upstream face of said distributor means constructed of fluid transmitting material and said pressure means including menas for directing pressurized fluid internally of said distributor means and through said upstream face thereof.

3. In a fluent material flow meter according to claim 2 further including rotatable means for rotating said distributor means, and wherein said rotatable means and said signal means are motivated by fluid pressure.

References Cited by the Examiner
UNITED STATES PATENTS

| | | | |
|---|---|---|---|
| 2,723,054 | 11/1955 | Louden et al. | 222—195 |
| 2,771,772 | 11/1956 | Kirwan | 73—194 |
| 3,056,293 | 10/1962 | Ofner | 73—198 |
| 3,212,330 | 10/1965 | De Pollier | 73—228 |

FOREIGN PATENTS

| | | |
|---|---|---|
| 604,049 | 10/1934 | Germany. |

RICHARD C. QUEISSER, *Primary Examiner.*

EDWARD D. GILHOOLY, *Assistant Examiner.*